United States Patent
Tsukashima et al.

(10) Patent No.: US 6,942,490 B2
(45) Date of Patent: Sep. 13, 2005

(54) ROUTING STRUCTURE OF VEHICLE CONNECTOR

(75) Inventors: Hiroyuki Tsukashima, Toyota (JP); Takamasa Takeuchi, Anjo (JP); Sho Miyazaki, Yokkaichi (JP)

(73) Assignees: Toyota Jidosha Kabushiki Kaisha, Toyota (JP); Aisin AW Co., Ltd., Anjo (JP); Autonetworks Technologies, Ltd., Yokkaichi (JP); Sumitomo Wiring Systems, Ltd, Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/856,859

(22) Filed: Jun. 1, 2004

(65) Prior Publication Data

US 2004/0266241 A1 Dec. 30, 2004

(30) Foreign Application Priority Data

Jun. 25, 2003 (JP) ........................................ 2003-180384

(51) Int. Cl.[7] .............................................. H01R 33/00
(52) U.S. Cl. ........................................ 439/34; 180/65.2
(58) Field of Search .................. 439/34, 212; 180/65.1, 180/65.2, 65.8, 291; 280/782

(56) References Cited

U.S. PATENT DOCUMENTS

| | | | | |
|---|---|---|---|---|
| 4,943,241 A | * | 7/1990 | Watanabe et al. ............. | 439/34 |
| 5,288,141 A | * | 2/1994 | Isshiki et al. ............. | 303/119.3 |
| 6,209,672 B1 | * | 4/2001 | Severinsky ................. | 180/65.2 |
| 6,223,106 B1 | * | 4/2001 | Yano et al. .................... | 701/22 |
| 6,492,785 B1 | * | 12/2002 | Kasten et al. ............... | 318/434 |
| 6,554,088 B2 | * | 4/2003 | Severinsky et al. ......... | 180/65.2 |
| 6,644,427 B2 | * | 11/2003 | Schulte ....................... | 180/65.2 |
| 6,651,759 B1 | * | 11/2003 | Gruenwald et al. ......... | 180/65.2 |
| 6,683,389 B2 | * | 1/2004 | Geis ........................... | 290/40 C |
| 6,692,403 B2 | * | 2/2004 | Charaudeau et al. ........... | 477/3 |
| 6,717,281 B1 | * | 4/2004 | Brandon et al. ........... | 290/40 C |

FOREIGN PATENT DOCUMENTS

| | | |
|---|---|---|
| JP | A 2000-253511 | 9/2000 |
| JP | A 2002-075557 | 3/2002 |

* cited by examiner

Primary Examiner—Gary Paumen
(74) Attorney, Agent, or Firm—Oliff & Berridge, PLC

(57) ABSTRACT

A vehicle-connector routing structure is provided with which routing can be made through a narrow space. The vehicle-connector routing structure includes a chassis having an engine compartment and a tunnel continuing from the engine compartment, motors provided in the tunnel, and vehicle connectors connected to the motors. The vehicle connectors include bus bars extending at least from the motors to the engine compartment through the tunnel. One bus bar extends to an inverter. The other bus bar is connected to a flexible electric wire.

6 Claims, 3 Drawing Sheets

ROUTING STRUCTURE OF VEHICLE CONNECTOR

This nonprovisional application is based on Japanese Patent Application No. 2003-180384 filed with the Japan Patent Office on Jun. 25, 2003 the entire contents of which are hereby incorporated by reference.

BACKGROUND OF THE INVENTION

1. Field of the Invention

The present invention relates to a routing structure of a vehicle connector. In particular, the invention relates to a routing structure of a vehicle connector attached to a motor of a vehicle.

2. Description of the Background Art

Japanese Patent Laying-Open No. 2002-75557 discloses one example of conventional connectors.

The above-mentioned connector has a large number of parts for connection resulting in increase in size. Such a large-sized connector is difficult to route through a narrow space in a vehicle.

SUMMARY OF THE INVENTION

The present invention is accordingly made to solve the problem above and provide a routing structure of a vehicle connector that can be routed through a narrow space.

According to an aspect of the present invention, a vehicle-connector routing structure includes a chassis having an engine compartment and a tunnel continuing from the engine compartment, a motor provided in the tunnel and a vehicle connector connected to the motor. The vehicle connector includes a bus bar extending at least from the motor to the engine compartment through the tunnel.

In the vehicle-connector routing structure, the vehicle connector includes the bus bar extending at least from the motor through the tunnel to the engine compartment. The routing is thus effected within the tunnel with the bus bar, so that components for connection can be decreased in the tunnel. Accordingly, the vehicle-connector routing structure is provided with which routing can be made in a narrow tunnel space.

Preferably, the vehicle-connector routing structure further includes an inverter provided in the engine compartment, and the bus bar extends to the inverter. In this way, the connection between the motor and the inverter can be made with one bus bar, so that the number of components can be decreased and the production cost can be reduced.

Still preferably, the vehicle-connector routing structure further includes an inverter provided in the engine compartment and a flexible electric wire connecting the inverter and the bus bar to each other. The inverter and the bus bar are thus connected with the flexible electric wire to increase the degree of freedom with respect to routing between the inverter and the bus bar.

According to another aspect of the present invention, a vehicle-connector routing structure includes a drive unit provided in a tunnel of a chassis and coupled to an engine, a motor provided in the drive unit, and a vehicle connector connected to the motor. The vehicle connector includes a bus bar extending at least from the motor toward the engine.

In the vehicle-connector routing structure, the vehicle connector includes the bus bar extending at least from the motor toward the engine, so that the bus bar can be routed through a narrow space.

Preferably, the vehicle connector extends to a front end of the drive unit.

Still preferably, the vehicle connector includes a plurality of bus bars and the bus bars are stacked in the direction of thickness. In this way, the cross-sectional area of the bus bars can be increased to lower electrical resistance of the bus bars.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
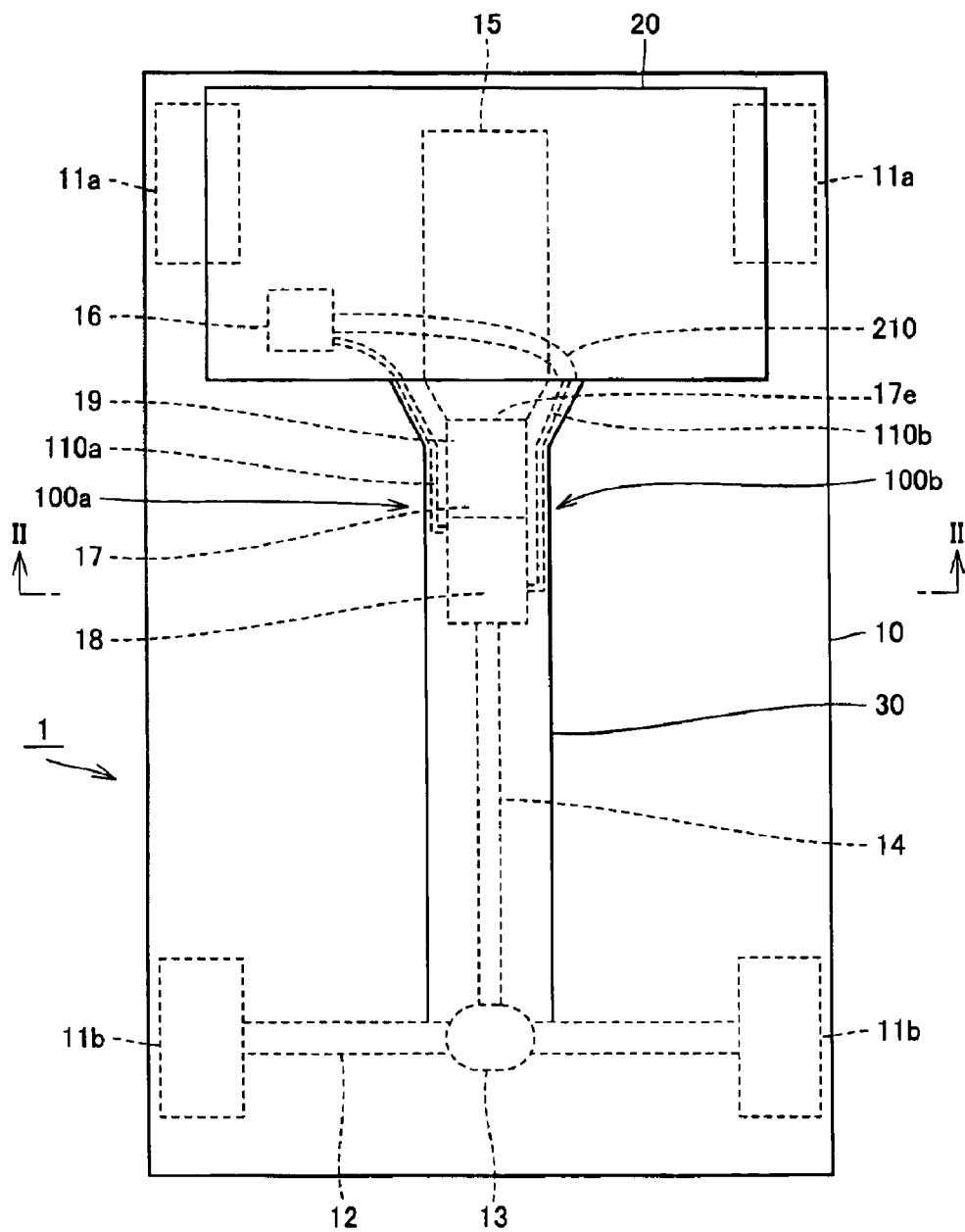
FIG. 1 is a plan view of a vehicle-connector routing structure according to a first embodiment of the present invention.

An embodiment of the present invention is hereinafter described in connection with the drawings. It is noted here that like components in the following embodiment are denoted by like reference characters and description thereof are not repeated.

First Embodiment

Referring to FIG. 1, according to a first embodiment of the present invention, a vehicle-connector routing structure 1 includes a chassis 10 having an engine compartment 20 and a tunnel 30 continuing from engine compartment 20, motors 17 and 18 provided in tunnel 30, and vehicle connectors 100a and 100b connected respectively to motors 17 and 18. Vehicle connectors 100a and 100b include respective bus bars 110a and 110b extending at least from motors 17 and 18 to engine compartment 20 through tunnel 30. Vehicle-connector routing structure 1 further includes an inverter 16 provided in engine compartment 20. Bus bar 110a extends to inverter 16.

Vehicle-connector routing structure 1 further includes a flexible electric wire 210 connecting inverter 16 and bus bar 110b to each other.

Vehicle-connector routing structure 1 thus includes motors 17 and 18 as well as a propeller shaft 14 that serve as a drive unit provided in tunnel 30 of chassis 10 and coupled to an engine 15, motors 17 and 18 provided in the drive unit, and vehicle connectors 100a and 100b connected respectively to motors 17 and 18. Vehicle connectors 100a and 100b include respective bus bars 110a and 110b extending at least from motors 17 and 18 toward engine 15.

The vehicle connectors extend to a front end 17e of motor 17 corresponding to the front end of the drive unit.

On the four corners of chassis 10, front wheels 11a and rear wheels 11b are attached.

Engine compartment 20 is located between front wheels 11a to serve as a space for housing engine 15. Within engine compartment 20, inverter 16 for supplying electric power to motors 17 and 18 is provided in addition to engine 15. In FIG. 1, the longer axis of engine 15 extends in the direction of travel of the vehicle and thus this engine is a so-called "longitudinally-mounted" engine. Engine 15 is not limited to a particular type of engine and may be any of such generally employed engines as straight (in-line) engine, V-type engine and boxer-type (horizontally-opposed) engine. In addition, engine 15 is not limited to a gasoline engine and may be a diesel engine. Further, engine 15 may be any of engines having other gases as fuels.

Although inverter 16 shown in FIG. 1 is provided on the left side of engine 15, the position of inverter 16 is not limited to this. Alternatively, inverter 16 may be provided on the right side of or coaxially with engine 15.

Tunnel 30 continues from engine compartment 20. Tunnel 30 serves as a space for housing motors 17 and 18 as well as propeller shaft 14.

In tunnel 30, motors 17 and 18 and propeller shaft 14 are thus housed. Motors 17 and 18 are each motor/generator converting mechanical drive power into electric power and vice versa. Although two motors 17 and 18 are provided in FIG. 1, only one motor may be provided. Alternatively, three or more motors may be provided.

Further, a gearbox (e.g. a planetary gear of a splitter) may be housed in tunnel 30. The gearbox is placed between motor 18 (M/G) and propeller shaft 14.

To motors 17 and 18, vehicle connectors 100a and 100b are connected. Specifically, vehicle connector 100a is connected to motor 17 and vehicle connector 100b is connected to motor 18. Vehicle connector 100a has bus bar 100a. Bus bar 110a extends from motor 17 to inverter 16 for connecting inverter 16 and motor 17 to each other. Bus bar 10a is constructed of metal plate materials. A part of bus bar 110a extends through tunnel 30 and the remaining part thereof extends in engine compartment 20.

To motor 18, bus bar 110b of vehicle connector 100b is connected. Bus bar 110b extends through tunnel 30 from motor 18 to engine compartment 20. In engine compartment 20, bus bar 110b is connected to electric wire 210 made of copper. Electric wire 210 connects inverter 16 and bus bar 110b to each other.

An output from motor 18 is transmitted to rear wheels 11b through propeller shaft 14, a differential gear 13 and an axle 12. Although engine 15 is provided in the front part of the vehicle in this embodiment, the position of the engine is not limited thereto and may be provided in the central part of the vehicle.

Figure 2:
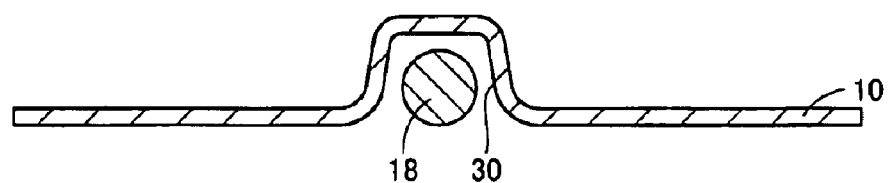
FIG. 2 is a cross-sectional view along line II—II in FIG. 1.

Referring to FIG. 2, tunnel 30 is shown as a protruded portion of chassis 10. The shape of protrusion of tunnel 30 serves to increase the strength of chassis 10. Motor 18 is provided within tunnel 30. In addition, a connector (not shown) for supplying electric power to motor 18 is provided within tunnel 30 and this vehicle connector is routed in the space between motors 18 and 17 and the sidewall of tunnel 30.

Figure 3:
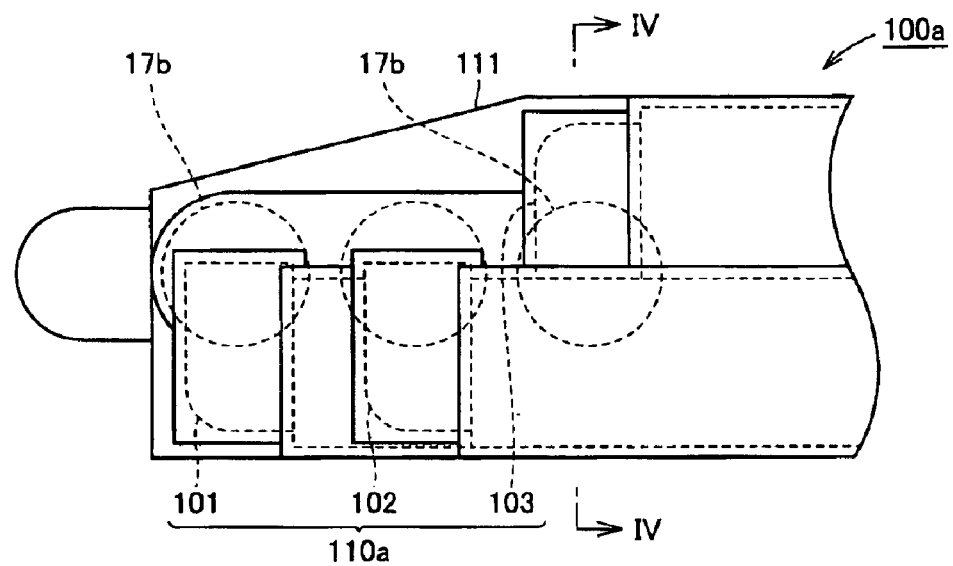
FIG. 3 is a plan view of a vehicle connector shown in FIG. 1.

Referring to FIG. 3, vehicle connector 100a has bus bar 110a. Bus bar 110a is constructed of three bus bars 101, 102 and 103. Three bus bars 101, 102 and 103 are thus assembled into one bus bar 110a. The number of bus bars is not limited to three as shown in FIG. 3 and may be one or more than one. A shield cover 111 is spread over bus bars 101, 102 and 103.

Figure 4:
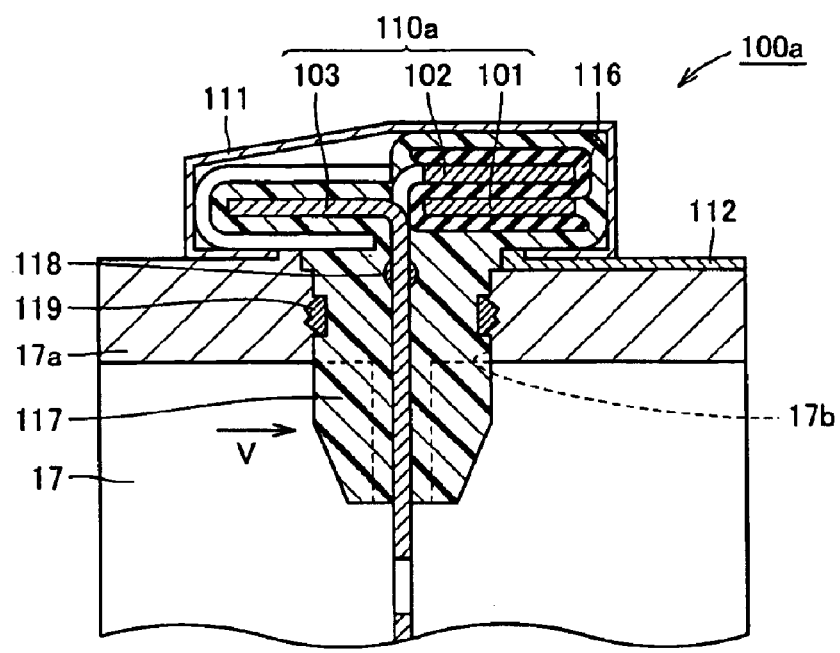
FIG. 4 is a cross-sectional view along line IV—IV in FIG. 3.

Referring to FIG. 4, vehicle connector 100a includes a plurality of bus bars 101, 102 and 103, shield covers 111 and 112 shielding bus bars 101, 102 and 103, a separator 116 provided between bus bars 101, 102 and 103 for keeping electrical insulation from each other, a mold member 117 enclosing bus bars 101, 102 and 103 as well as separator 116, a rubber ring 119 provided to mold member 117, and a seal rubber 118 provided between bus bar 103 and mold member 117. To a housing 17a of motor 17, vehicle connector 100a is attached. Vehicle connector 100a is fixed with bolts (not shown in FIG. 4). Shield covers 111 and 112 are each made of such an electrically conductive material as aluminum, copper or iron. Shield covers 111 and 112 are only required to serve as electromagnetic shields and thus the material of shield covers 111 and 112 is not limited to metals and may be electrically-conductive resin for example.

Bus bar 103 is L-shaped and has a first section contained in housing 17a and a second section extending almost perpendicularly to the first section. A plurality of bus bars 101, 102 and 103 are bent on exiting from housing 17a, and bus bars 101 and 102 are laid on each other. In other words, vehicle connector 100a includes a plurality of bus bars 101 and 102 and these bus bars 101 and 102 are stacked in the direction of thickness. Bus bar 103 is inserted into a hole 17b of housing 17a.

These bus bars 101, 102 and 103 are electrically insulated from each other by separator 116. Separator 116 is required to have a high electrical-insulation characteristic. Mold member 117 is provided to cover separator 116. The mold member is an insulation material of resin. Mold member 117 is required to have a high electrical-insulation characteristic and excellent moldability for injection molding for example.

Shield covers 111 and 112 are laid over bus bar 110a and bus bar 110a and shield covers 111 and 112 constitute a shield wire.

It is seen from FIG. 4 that thin vehicle connector 100a having bus bar 110a molded with mold member 117 can be used to minimize the degree of protrusion of vehicle connector 100a from motor 17 and thereby allow vehicle connector 110a to be routed through the limited space of tunnel 30.

Figure 5:
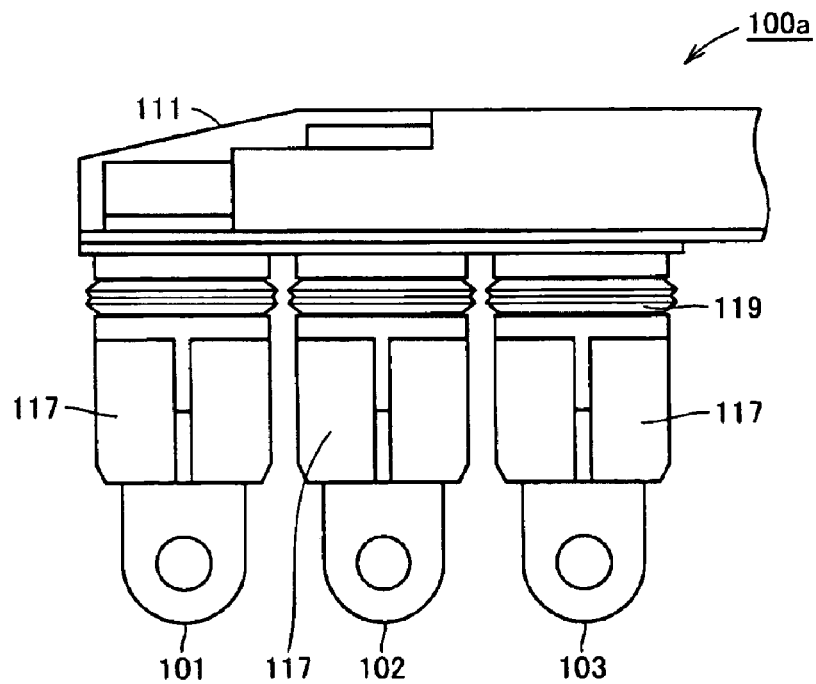
FIG. 5 is a side view of the vehicle connector seen in the direction indicated by arrow V in FIG. 4.

Bus bar 110a is covered with separator 116. Bus bar 110a covered with separator 116 is molded with resin mold member 117. In this way, a molded-connector is completed. A noise shield is formed by fitting shield covers 111 and 112 in the molded connector. The molded connector with the noise shield formed is fit in housing 17a so that the structure shown in FIGS. 4 and 5 is completed.

With the routing structure of the vehicle connector according to the present invention, only the thickness of bus bar 110a itself and the thickness of separator 116 correspond to the height of vehicle connector 100a so that the height thereof can be minimized. Accordingly, the vehicle connector can be routed through a space within narrow tunnel 30. Further, as shown in FIG. 1, the number of components can be reduced by extending bus bar 110a into engine compartment 20.

Moreover, as shown in FIG. 1, bus bar 110b is connected to flexible electric wire 210 in engine compartment 20. Electric wire 210 is thus provided in the spacious place so that electric wire 210 serves to absorb vibrations of the whole connector structure to improve the strength.

The embodiment of the present invention has heretofore been described. The embodiment illustrated herein can be modified in various ways. While bus bar 110a and bus bar 110b are provided respectively in the left part and the right part of the vehicle, the arrangement is not limited to the above-described one. Specifically, bus bars 110a and 110b may collectively be provided in only the right or left part of the vehicle. Moreover, preferably bus bars 110*a* and 110*b* in tunnel 30 and engine compartment 20 are electromagnetically shielded with any electrically-conductive member. In addition, while engine 15 and motor 17 are directly connected and motors 17 and 18 are directly connected in FIG. 1, any power transmission member may be provided therebetween.

The electromagnetic shield for bus bars 110*a* and 110*b* may be made of any of various electrically-conductive materials in addition to metals. For example, the shield may be made of electrically-conductive composite polymer produced by allowing a large amount of fine particles of carbon black, metal or metal oxide for example to be dispersed and mixed in a polymer solvent. Alternatively, a large amount of main-chain conjugated polymers like polyacetylene, poly(p-phenylene), polyphenylene sulfide or polypyrrole for example may be doped with a small amount of electron-accepting molecules like iodine or arsenic or electron-donating substance like sodium metal.

According to the present invention, the vehicle-connector routing structure can be provided to allow the vehicle connector to be routed through a narrow space.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A vehicle-connector routing structure comprising:
    a chassis having an engine compartment and a tunnel continuing from said engine compartment;
    a motor provided in said tunnel; and
    a vehicle connector connected to said motor,
    said vehicle connector including a bus bar extending at least from said motor to said engine compartment through said tunnel.

2. The vehicle-connector routing structure according to claim 1, further comprising an inverter provided in said engine compartment, wherein
    said bus bar extends to said inverter.

3. The vehicle-connector routing structure according to claim 1, further comprising:
    an inverter provided in said engine compartment; and
    a flexible electric wire connecting said inverter and said bus bar to each other.

4. A vehicle-connector routing structure comprising:
    a drive unit provided in a tunnel of a chassis and coupled to an engine;
    a motor provided in said drive unit; and
    a vehicle connector connected to said motor,
    said vehicle connector including a bus bar extending at least from said motor toward said engine.

5. The vehicle-connector routing structure according to claim 4, wherein
    said vehicle connector extends to a front end of said drive unit.

6. The vehicle-connector routing structure according to claim 4, wherein
    said vehicle connector includes a plurality of said bus bars and said plurality of bus bars are stacked in the direction of thickness.

* * * * *